(12) United States Patent
Hirano

(10) Patent No.: US 9,103,380 B2
(45) Date of Patent: Aug. 11, 2015

(54) AXLE SUPPORT STRUCTURE

(75) Inventor: Hiroyuki Hirano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/345,611

(22) PCT Filed: Sep. 14, 2012

(86) PCT No.: PCT/JP2012/073588
§ 371 (c)(1),
(2), (4) Date: Mar. 18, 2014

(87) PCT Pub. No.: WO2013/054638
PCT Pub. Date: Apr. 18, 2013

(65) Prior Publication Data
US 2014/0353056 A1 Dec. 4, 2014

(30) Foreign Application Priority Data

Oct. 12, 2011 (JP) ................................. 2011-224544

(51) Int. Cl.
*B60B 35/12* (2006.01)
*F16D 3/10* (2006.01)
(Continued)

(52) U.S. Cl.
CPC .............. *F16D 3/10* (2013.01); *B60B 27/0031* (2013.01); *B60B 35/121* (2013.01); *B60K 7/0007* (2013.01); *F16C 19/55* (2013.01); *F16D 3/185* (2013.01); *B60B 27/00* (2013.01);
(Continued)

(58) Field of Classification Search
CPC .................... B60K 7/0007; B60K 2007/0038; B60K 2007/0092; B60K 27/052

USPC ............................................... 180/65.51, 65.6
See application file for complete search history.

(56) References Cited

U.S. PATENT DOCUMENTS 4,351,407 A * 9/1982 Call ............................. 180/385
6,254,196 B1 * 7/2001 Gee ............................ 301/124.1
(Continued)

FOREIGN PATENT DOCUMENTS

JP          53-48944 U     4/1978
JP          62-147122 A    7/1987
(Continued)

OTHER PUBLICATIONS

The Extended European Search Report for the corresponding European patent application No. 12839377.4 issued on Feb. 12, 2015.

*Primary Examiner* — John Walters
*Assistant Examiner* — Brian Swenson
(74) *Attorney, Agent, or Firm* — Global IP Counselors, LLP

(57) ABSTRACT

An axle support structure includes a drive source output shaft, an axle, a vehicle body-side member, a vehicle wheel bearing and a floating shaft. The drive source output shaft is configured to be rotated by a drive source. The axle is disposed coaxially with the drive source output shaft to rotate integrally with a vehicle wheel. The vehicle wheel bearing is coupled to the axle for rotatably supporting the axle on a vehicle body-side member. The floating shaft has a first linking part linked with the drive source output shaft with a degree of freedom in a non-rotational direction, and a second linking part linked with the axle with a degree of freedom in a non-rotational direction, such that power is transmitted from the drive source output shaft to the axle. The vehicle wheel bearing is disposed axially between the first and second linking parts.

20 Claims, 14 Drawing Sheets

(51) Int. Cl.
*B60K 7/00* (2006.01)
*F16D 3/18* (2006.01)
*F16C 19/55* (2006.01)
B60B 27/00 (2006.01)
B60K 17/04 (2006.01)
F16C 19/18 (2006.01)

(52) U.S. Cl.
CPC .......... *B60B 27/0052* (2013.01); *B60K 17/046* (2013.01); *B60K 2007/0038* (2013.01); *B60K 2007/0053* (2013.01); *B60K 2007/0092* (2013.01); *F16C 19/186* (2013.01)

(56) References Cited

U.S. PATENT DOCUMENTS

| | | | |
|---|---|---|---|
| 6,557,947 B1 * | 5/2003 | Hunt | 301/137 |
| 7,845,445 B2 * | 12/2010 | Cooper et al. | 180/65.51 |
| 2007/0257570 A1 * | 11/2007 | Walter et al. | 310/67 R |
| 2009/0133944 A1 * | 5/2009 | Nishioka et al. | 180/65.51 |
| 2010/0236848 A1 * | 9/2010 | Loeber | 180/65.51 |

FOREIGN PATENT DOCUMENTS

| | | |
|---|---|---|
| JP | 63-112626 U | 7/1988 |
| JP | 5-76607 U | 10/1993 |
| JP | 2002-61662 A | 2/2002 |
| JP | 2005-249159 A | 9/2005 |
| JP | 2006-97758 A | 4/2006 |
| JP | 2008-189187 A | 8/2008 |
| JP | 2008-189212 A | 8/2008 |
| JP | 2009-190440 A | 8/2009 |
| JP | 2010-181011 A | 8/2010 |
| WO | 2005/023575 A1 | 3/2005 |

* cited by examiner

AXLE SUPPORT STRUCTURE

CROSS-REFERENCE TO RELATED APPLICATIONS

This application is a U.S. National stage application of International Application No. PCT/JP2012/073588, filed Sep. 14, 2012, which claims priority to Japanese Patent Application No. 2011-224544 filed in Japan on Oct. 12, 2011.

BACKGROUND

1. Field of the Invention

The present invention relates to an axle support structure for supporting an axle that rotates integrally with a vehicle wheel.

2. Background Information

In the past there have been axle support structures in which a speed reducer-side rotating shaft rotated by a speed reducer, and an axle that rotates integrally with a vehicle wheel and that is rotatably supported on a vehicle body-side member via a hub bearing, are coaxially linked via a serration structure (see Japanese Laid-Open Patent Publication No. 2008-189187, for example).

SUMMARY

However, a problem with a conventional axle support structure is that when the axle wobbles due to wear of the hub bearing or the like and the axle is misaligned from the speed reducer-side rotating shaft, the speed reducer-side rotating shaft also whirls in a position offset from the proper axial center.

The present invention was devised in view of the above problem, and an object of the invention is to provide an axle support structure that can prevent shaft wobble of an axle from being transmitted to a drive source output shaft rotated by a drive source when shaft wobble occurs.

To achieve the object described above, an axle support structure of the present invention comprises a drive source output shaft, an axle, and a floating shaft. The drive source output shaft is a rotating shaft that is caused to rotate by a drive source. The axle is a rotating shaft that is disposed coaxially with the drive source output shaft and that rotates integrally with a vehicle wheel. The floating shaft has a first linking part linked with the drive source output shaft with a degree of freedom in a direction other than the direction of rotation, and a second linking part linked with the axle with a degree of freedom in a direction other than the direction of rotation; and the floating shaft transmits power from the drive source output shaft to the axle.

In the axle support structure of the present invention, the drive source output shaft and the first linking part of the floating shaft are linked with a degree of freedom in a direction other than the direction of rotation, and the axle and the second linking part of the floating shaft are linked with a degree of freedom in a direction other than the direction of rotation. Specifically, joints can be created in two locations: between the drive source output shaft and the floating shaft, and between the axle and the floating shaft; by linking the drive source output shaft and the axle via the floating shaft. Therefore, even if the axle causes a comparatively large misalignment or the axial center moves parallel, the misalignment in the axial direction and perpendicular to the axial direction is absorbed by the first linking part and the second linking part, and the misalignment is not transmitted to the drive source output shaft. As a result, when shaft wobble occurs in the axle, the shaft wobble can be prevented from being transmitted to the drive source output shaft rotated by the drive source. Furthermore, the drive source and a deceleration device connected to the upstream side of the drive source output shaft can be prevented from whirling, and loss of acoustic vibration performance and a decline in durability can be prevented.

BRIEF DESCRIPTION OF THE DRAWINGS

Referring now to the attached drawings which form a part of this original disclosure.

BRIEF DESCRIPTION OF THE DRAWINGS

Figure 1:
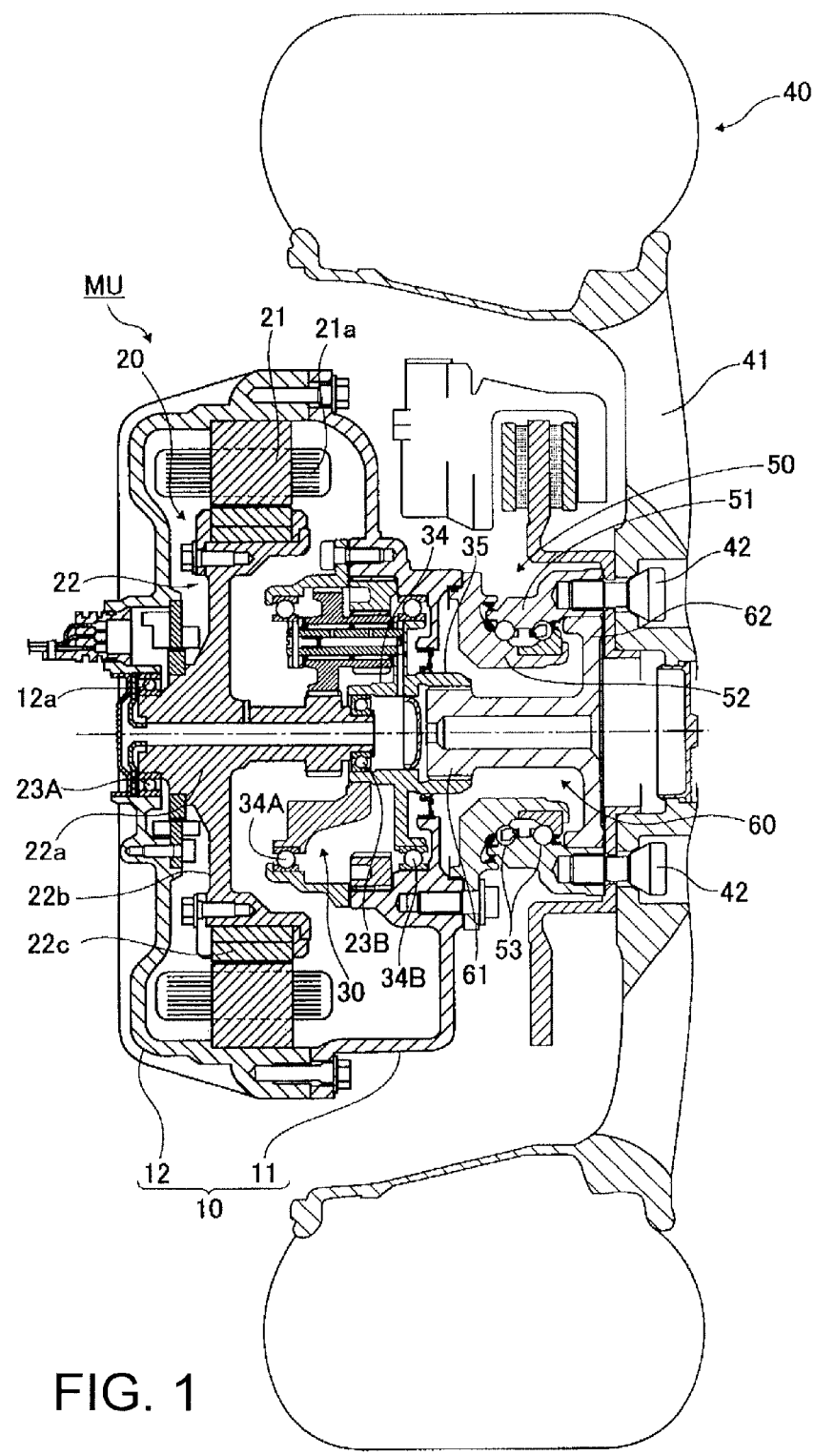
FIG. 1 is a longitudinal cross-sectional view showing an in-wheel motor unit to which the axle support structure of a first embodiment is applied.

Several embodiments of the axle support structure of the present invention are described below based on six illustrative embodiments as shown in the drawings.

First Embodiment

First, the configuration in the axle support structure of the first embodiment is described in two parts: a "configuration of an applied example of the axle support structure" and a "configuration of the floating shaft."

Description of Applied Example of Axle Support Structure

Figure 2:
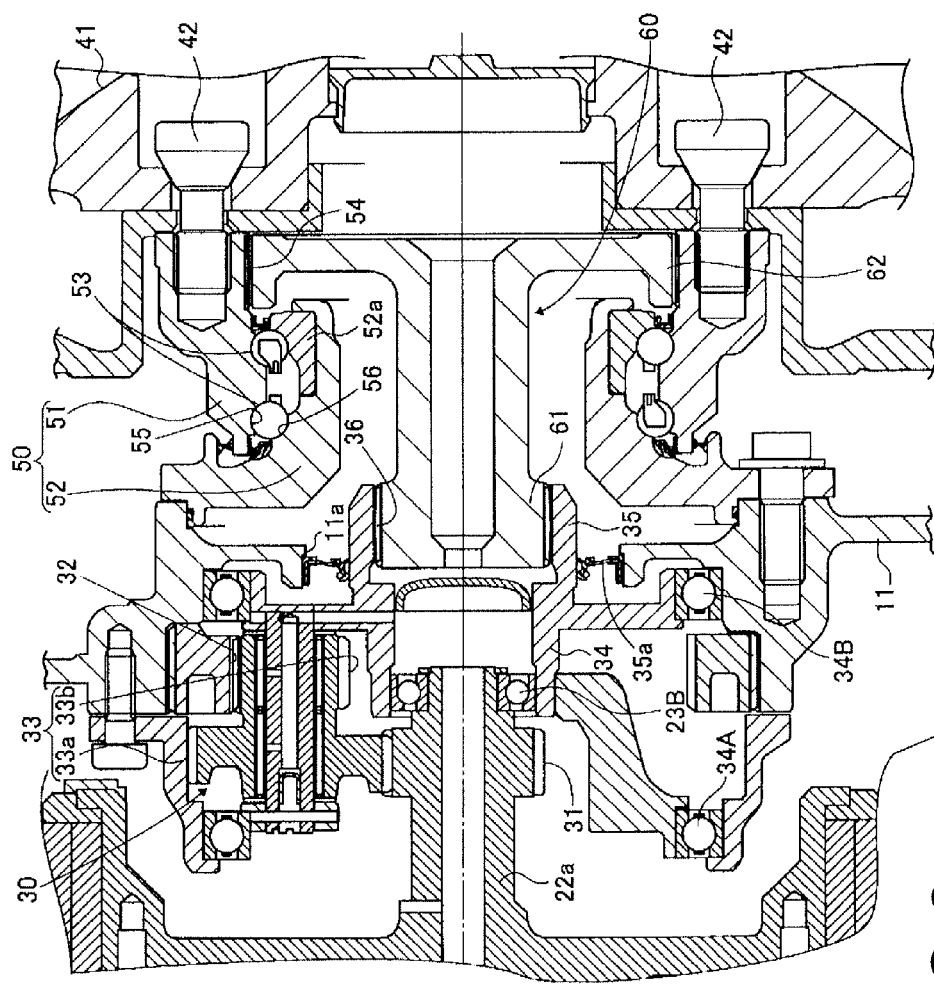
FIG. 2 is an enlarged view showing the main section of the in-wheel motor unit shown in FIG. 1.

FIG. 1 is a longitudinal cross-sectional view showing an in-wheel motor unit to which the axle support structure of the first embodiment is applied. FIG. 2 is an enlarged view showing the main section of the in-wheel motor unit shown in FIG. 1.

In the in-wheel motor unit MU shown in FIG. 1, an electric motor 20 for drivably controlling a vehicle wheel 40 is disposed on the inner side of a wheel 41 supporting the vehicle wheel 40, and the motor unit has a motor case 10, the electric motor 20, and a speed reducer 30.

The motor case 10 comprises a case main body 11 and a cover 12, and the case is configured with the cover 12 combined with the left-hand side of the case main body 11 in FIG. 1. The interior of the motor case 10 coaxially accommodates the electric motor 20 which is a drive source, and the speed reducer 30 which decelerates and outputs the rotation of the electric motor 20. The motor case 10 is held so as to be capable of pivoting relative to a part of the vehicle body such as a side member, via a suspension mechanism (not shown).

The electric motor 20 is positioned on the inner side of the cover 12, and the motor has an annular stator 21 and a rotor 22 disposed coaxially inside the stator 21.

The stator 21 is composed of a wound coil 21a, and is fixed to the internal periphery of the cover 12 by a method such as shrink fitting the external peripheral surface.

The rotor 22 has a rotor rotating shaft 22a, a flange 22b, a layered steel plate 22c, and a permanent magnet (not shown). The rotor rotating shaft 22a is rotatably supported at one end in a first rotor bearing 23A fitted into the inner side of an opening 12a formed through the cover 12, and is rotatably supported at the other end in a second rotor bearing 23B fitted into an inside end of a carrier 34, described hereinafter, of the speed reducer 30. The layered steel plate 22c is fixed to the external periphery of the flange 22b which protrudes diametrically outward from the rotor rotating shaft 22a, and a permanent magnet (not shown) is embedded in the external periphery of the layered steel plate 22c. The rotor 22 is disposed in a position in the axial direction where the permanent magnet embedded in the external periphery of the layered steel plate 22c faces the internal peripheral surface of the stator 21, and is held in this position while the rotor rotating shaft 22a is supported.

The speed reducer 30 is configured, as shown in FIG. 2, from a planetary gear assembly, having a sun gear 31 formed on the rotor rotating shaft 22a, a ring gear 32 fixed inside the case main body 11 by a protruding pawl or the like so as to be capable only of pivoting somewhat, three ridged pinions 33 (only one is shown) made by integrally molding a large-diameter pinion portion 33a the meshes with the sun gear 31 and a small-diameter pinion portion 33b that meshes with the ring gear 32, and a carrier 34 rotatably supporting the ridged pinions 33.

The carrier 34 is an output member of the speed reducer 30, and is rotatably supported on the case main body 11 via a first carrier bearing 34A and a second carrier bearing 34B. The carrier 34 is rotatably supported with the three ridged pinions 33 disposed at equal intervals around the circumferential direction. A cylindrical output shaft part 35 protruding toward the vehicle wheel 40 from an opening 11a of the case main body 11 is formed in the end of the carrier 34.

The output shaft part 35 is a drive source output shaft rotated by the electric motor 20 which is a travel drive source, and the output shaft part has a cylindrical shape that opens toward the vehicle wheel 40. A first connecting part 36, which is composed of serrations, is formed in the internal peripheral surface of the output shaft part 35. The term "serrations" herein refers to a plurality of concavities and convexities that extend along the axial direction and that are aligned in the circumferential direction. The same applies below.

The external peripheral side of the output shaft part 35 is provided with an annular oil seal 35a for closing up the space between the external peripheral side and the opening 11a of the case main body 11. The oil seal 35a, which is stored within the motor case 10, prevents the oil used to cool the electric motor 20 and to lubricate the speed reducer 30 from leaking out.

Furthermore, the wheel 41 is rotatably supported on the case main body 11 via a hub bearing 50. At this time, the output shaft part 35, the hub bearing 50, and the wheel 41 are disposed coaxially.

The hub bearing 50 has an outside wheel rotating part (an outer member) 51 fixed to the wheel 41, an inside wheel fixed part (an inner member) 52 fixed to the case main body 11, and a rolling element 53 disposed between the outside wheel rotating part 51 and the inside wheel fixed part 52, as shown in FIG. 2.

The outside wheel rotating part 51 is an axle that is fixed via a plurality of wheel bolts 42 to the internal peripheral surface of the wheel 41 that faces the electric motor 20, and that rotates integrally with the vehicle wheel 40. The outside wheel rotating part 51 has a cylindrical shape protruding toward the electric motor 20, and formed in the internal peripheral surface thereof are a second connecting part 54 composed of serrations, and a rolling surface 55 in contact with the rolling element 53. The second connecting part 54 is positioned near the vehicle wheel 40, and the rolling surface 55 is positioned near the electric motor 20. The inside diameter of the second connecting part 54 is set to a value greater than the inside diameter of the first connecting part 36 of the output shaft part 35.

The inside wheel fixed part 52, which has a cylindrical shape encircling the opening 11a of the case main body 11, is positioned on the inner side of the outside wheel rotating part 51, and a rolling surface 56 in contact with the rolling element 53 is formed in the external peripheral surface which faces the outside wheel rotating part 51. An inside wheel fixing piece 52a for holding the rolling element 53 is fitted into the open end of the inside wheel fixed part 52.

The output shaft part 35 and the outside wheel rotating part 51 of the hub bearing 50 are linked via a floating shaft 60. At this time, the floating shaft 60 is disposed on the inner side of the hub bearing 50.

Configuration of Floating Shaft

Figure 3A:
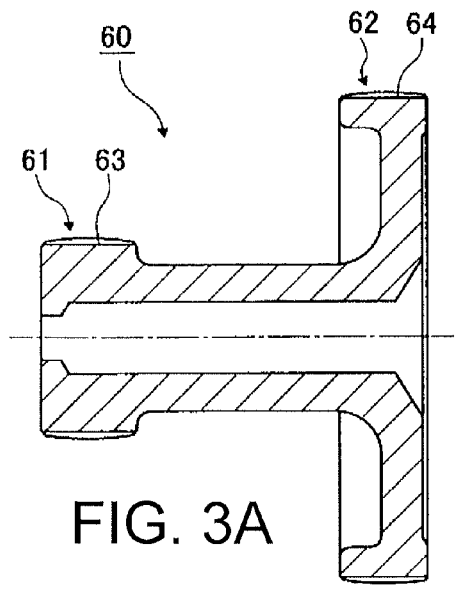
FIG. 3A is a longitudinal cross-sectional view showing the floating shaft of the first embodiment.
Figure 3B:
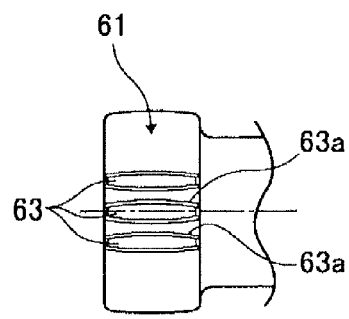
FIG. 3B is a side view showing the external peripheral surface of the first linking part.
Figure 3C:
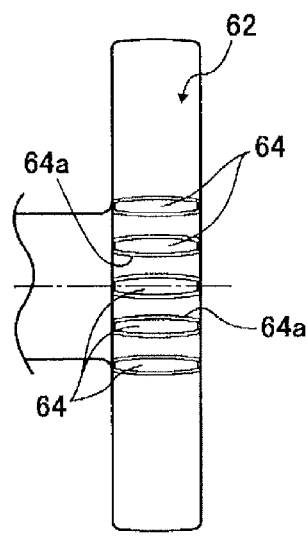
FIG. 3C is a side view showing the external peripheral surface of the second linking part.

FIG. 3A is a longitudinal cross-sectional view showing the floating shaft of the first embodiment. FIG. 3B is a side view showing the external peripheral surface of the first linking part. FIG. 3C is a side view showing the external peripheral surface of the second linking part.

The floating shaft 60 is a hollow metal shaft for transmitting power from the output shaft part 35 to the outside wheel rotating part 51. Formed in one end of this floating shaft 60 is a first linking part 61 linked with the output shaft part 35 with a degree of freedom in a direction other than the direction of rotation, and formed in the other end is a second linking part 62 linked with the outside wheel rotating part 51 with a degree of freedom in a direction other than the direction of rotation. The term "degree of freedom in a direction other than the direction of rotation" refers to a degree of freedom in the radial direction, such that the axial directions coincide and there is positional misalignment in parallel, for example; a degree of freedom in an inclined direction such that the axial directions differ; or the like.

The first linking part 61 has an outside diameter capable of fitting with the inner side of the output shaft part 35, and first floating connecting parts 63 composed of serrations are formed in the external peripheral surface thereof.

The first floating connecting parts 63, which are composed of concavities and convexities extending in the axial direction and capable of meshing with the first connecting part 36 formed in the internal peripheral surface of the output shaft part 35, are subjected to crowning to form side surfaces 63a at mid-height to come in contact with the first connecting part 36, and are thinned toward the distal ends. The first connecting part 36 and the first floating connecting parts 63 are coupled through serrations, whereby the output shaft part 35 and the floating shaft 60 are capable of rotating integrally.

The second linking part 62 has an outside diameter that is larger than the diameter of the first linking part 61 and that is capable of fitting with the inner side of the outside wheel rotating part 51 of the hub bearing 50, and second floating connecting parts 64 composed of serrations are formed in the external peripheral surface thereof.

The second floating connecting parts 64, which are composed of concavities and convexities extending in the axial direction and capable of meshing with the second connecting part 54 formed in the internal peripheral surface of the outside wheel rotating part 51, are subjected to crowning to form side surfaces 64a at mid-height to come in contact with the second connecting part 54, and are thinned toward the distal ends. The second connecting part 54 and the second floating connecting parts 64 are coupled through the serrations, whereby the outside wheel rotating part 51 and the floating shaft 60 are capable of rotating integrally.

Shaft Wobble Absorbing Action

Next, the "shaft wobble absorbing action" in the axle support structure of the first embodiment will be described.

When the rotor 22 of the electric motor 20 rotates in the in-wheel motor unit MU of the first embodiment, the rotation is transmitted from the rotor rotating shaft 22a to the carrier 34 via the sun gear 31 of the speed reducer 30. The output shaft part 35 is formed on the carrier 34, and the output shaft part 35 is caused to rotate by the rotation of the carrier 34. The outside wheel rotating part 51 of the hub bearing 50, which rotates integrally with the vehicle wheel 40, is linked to the output shaft part 35 via the floating shaft 60. Therefore, the outside wheel rotating part 51 rotates along with the rotation of the output shaft part 35, and power is transmitted from the output shaft part 35 to the outside wheel rotating part 51, rotating the vehicle wheel 40.

At this time, the outside wheel rotating part 51 is rotatably supported via the rolling element 53 on the inside wheel fixed part 52 fixed to the case main body 11.

When excessive external force is inputted to the hub bearing 50 via the vehicle wheel 40, for example, indentations are left in the rolling surfaces 55, 56 in contact with the rolling element 53. It is therefore assumed that so-called shaft wobble occurs, in which the pressurization imparted to the rolling element 53 ceases and the outside wheel rotating part 51 whirls. When muddy water or the like gets inside the hub bearing 50, i.e. between the outside wheel rotating part 51 and the inside wheel fixed part 52, there will be abnormal wear in the rolling surfaces 55, 56 in contact with the rolling element 53. The pressurization imparted to the rolling element 53 ceases, the outside wheel rotating part 51 whirls, and shaft wobble occurs at this time as well.

The outside wheel rotating part 51 is linked to the second linking part 62 of the floating shaft 60. The second linking part 62 herein is linked with the outside wheel rotating part 51 with a degree of freedom in a direction other than the direction of rotation, i.e., a degree of freedom in the radial direction, an inclined direction, or the like.

Therefore, even when shaft wobble of the outside wheel rotating part 51 occurs, the shaft wobble is absorbed by the alternating of the linked state in the second linking part 62, and the shaft wobble can be prevented from being transmitted to the output shaft part 35 linked to the other end of the floating shaft 60.

Furthermore, the output shaft part 35 is linked to the first linking part 61 of the floating shaft 60, but the first linking part 61 is linked with the output shaft part 35 with a degree of freedom in a direction other than the direction of rotation, i.e., a degree of freedom in the radial direction, an inclined direction, or the like.

Therefore, the shaft wobble of the outside wheel rotating part 51 can be absorbed by the alternating the linked state in the first linking part 61, and the shaft wobble can be prevented from being transmitted to the output shaft part 35 linked to the floating shaft 60.

Thus, misalignment caused by shaft wobble can be absorbed in two locations: between the output shaft part 35 and the floating shaft 60, and between the outside wheel rotating part 51 and the floating shaft 60; and a large degree of freedom relative to shaft wobble can therefore be ensured. Therefore, even if comparatively large shaft wobble occurs in the outside wheel rotating part 51, the force acting in the axial direction and perpendicular to the axial direction is not transmitted, and loss of acoustic vibration performance and deterioration of durability in the speed reducer 30 can be prevented.

Particularly, in the axle support structure of the first embodiment, the first connecting part 36 of the output shaft part 35 and the first floating connecting parts 63 of the first linking part 61 are coupled through serrations, but at this time, the first floating connecting parts 63 are subjected to crowning to form side surfaces 63a at mid-height to come in contact with the first connecting part 36, and are thinned toward the distal end. The second connecting part 54 of the outside wheel rotating part 51 and the second floating connecting parts 64 of the second linking part 62 are also coupled through serrations, but at this time, the second floating connecting parts 64 are subjected to crowning to form side surfaces 64a at mid-height to come in contact with the second connecting part 54, and are thinned toward the distal end.

Therefore, the contact portions in the first and second floating connecting parts 63, 64 are concentrated in the axial-directional middle, and are capable of pivoting comparatively far in the axial direction. An even greater degree of freedom can thereby be ensured between the floating shaft 60 and the output shaft part 35 and also between the outside wheel rotating part 51 and the floating shaft 60, and even large shaft wobble can be absorbed.

Furthermore, in the floating shaft 60 of the axle support structure of the first embodiment, the diameter of the second linking part 62 is set larger than the diameter of the first linking part 61. Therefore, when the floating shaft 60 is assembled, the floating shaft 60 can be inserted from the vehicle wheel 40 side toward the electric motor 20 side after the hub bearing 50 has been provided to the case main body 11 in advance. Components having gaps can thereby be assembled in a simple manner in the final stage of assembly, and the assembly performance can be improved.

Furthermore, in the axle support structure of the first embodiment, the outside wheel rotating part 51, which is an axle, is rotatably supported on the case main body 11 provided to be capable of pivoting on the vehicle body (not shown) via the hub bearing 50. At this time, the hub bearing 50 constitutes an axle with the inside wheel fixed part 52 fixed to the case main body 11, and rotates relative to the inside wheel fixed part 52. Specifically, the hub bearing 50 has a structure in which the outside wheel rotating part 51, which is an outer member, rotates together with the vehicle wheel 40.

Therefore, the diameter of the connecting portion between the hub bearing 50 and the floating shaft 60, i.e., the outside diameter of the second linking part 62 can be increased. The axial length of the second linking part 62 can thereby be shortened, and the axial dimension of the in-wheel motor unit MU can be shortened.

In the axle support structure of the first embodiment, the floating shaft 60 is disposed on the inner side of the hub bearing 50. The axial position of the floating shaft 60 and the axial position of the hub bearing 50 thereby overlap, and the axial dimension of the in-wheel motor unit MU can be shortened.

Next, the effects will be described. The effects presented below can be achieved in the axle support structure of the first embodiment.

(1) The configuration comprises: a drive source output shaft (output shaft part) 35 rotated by a drive source (electric motor) 20; an axle (outside wheel rotating part) 51 that is disposed coaxially with the drive source output shaft 35 and that rotates integrally with the vehicle wheel 40; and a floating shaft 60 having a first linking part 61 linked with the drive source output shaft 35 with a degree of freedom in a direction other than the direction of rotation, and a second linking part 62 linked with the axle 51 with a degree of freedom in a direction other than the direction of rotation, power being transmitted from the drive source output shaft 35 to the axle 51. Therefore, when shaft wobble occurs in the axle (outside wheel rotating part) 51, the shaft wobble can be prevented from being transmitted to the drive source output shaft (output shaft part) 35.

(2) The floating shaft 60 is configured such that serrations (first floating connecting parts, second floating connecting parts) 63, 64 made by crowning are provided to the first linking part 61 and/or the second linking part 62. Therefore, the linking degree of freedom in the first linking part 61 and the linking degree of freedom in the second linking part 62 can be further increased, and large shaft wobble can be dealt with.

(3) The floating shaft 60 is configured such that the diameter of the second linking part 62 is set larger than the diameter of the first linking part 61. Therefore, components having gaps can be assembled in a simple manner in the final stage of assembly, and the assembly performance can be improved.

(4) The vehicle wheel (outside wheel rotating part) 51 is rotatably supported via a vehicle wheel bearing (hub bearing) 50 on a vehicle body-side member (case main body) 11 that is provided in a pivotal manner to the vehicle body; and the vehicle wheel bearing 50 has an inner member (inside wheel fixed part) 52 fixed to the vehicle body-side member 11, and an outer member (outside wheel rotating part) 51 that is connected to the axle 51 and that rotates relative to the inner member 52. Therefore, the axial length of the second linking part 62 can be shortened, and the axial dimension can be shortened.

(5) The axle (outside wheel rotating part) 51 is rotatably supported via a vehicle wheel bearing (hub bearing) 50 on a vehicle body-side member (case main body) 11 provided in a pivotal manner to the vehicle body, and the floating shaft 60 is disposed on the inner side of the vehicle wheel bearing 50. Therefore, the axial position of the floating shaft 60 and the axial position of the hub bearing 50 overlap, and the axial dimension can be shortened.

Second Embodiment

The second embodiment is an example in which floating collars are interposed between the floating shaft and the drive source output shaft, and between the floating shaft and the axle.

Figure 4:
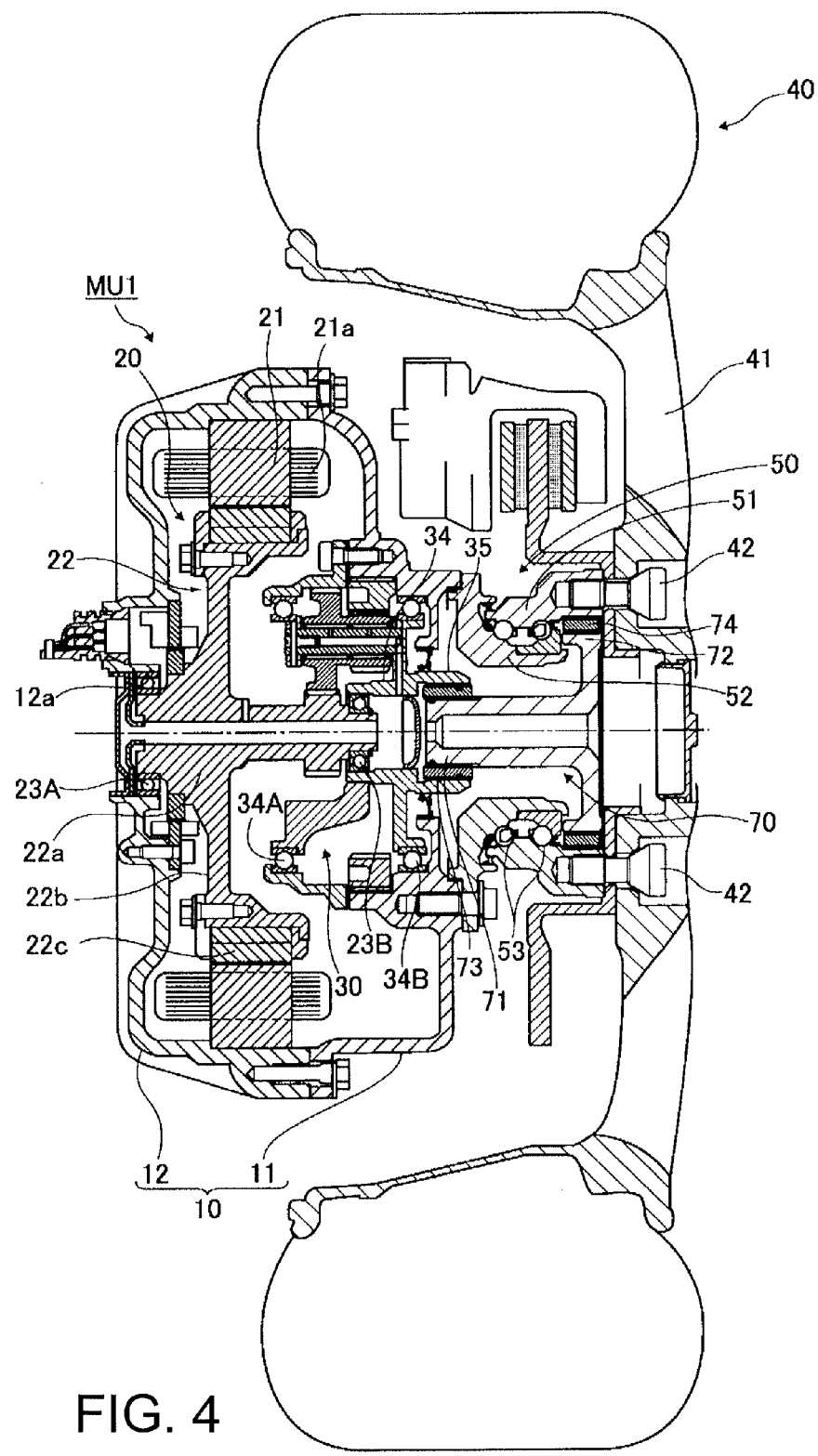
FIG. 4 is a longitudinal cross-sectional view showing an in-wheel motor unit to which the axle support structure of a second embodiment is applied.
Figure 5:
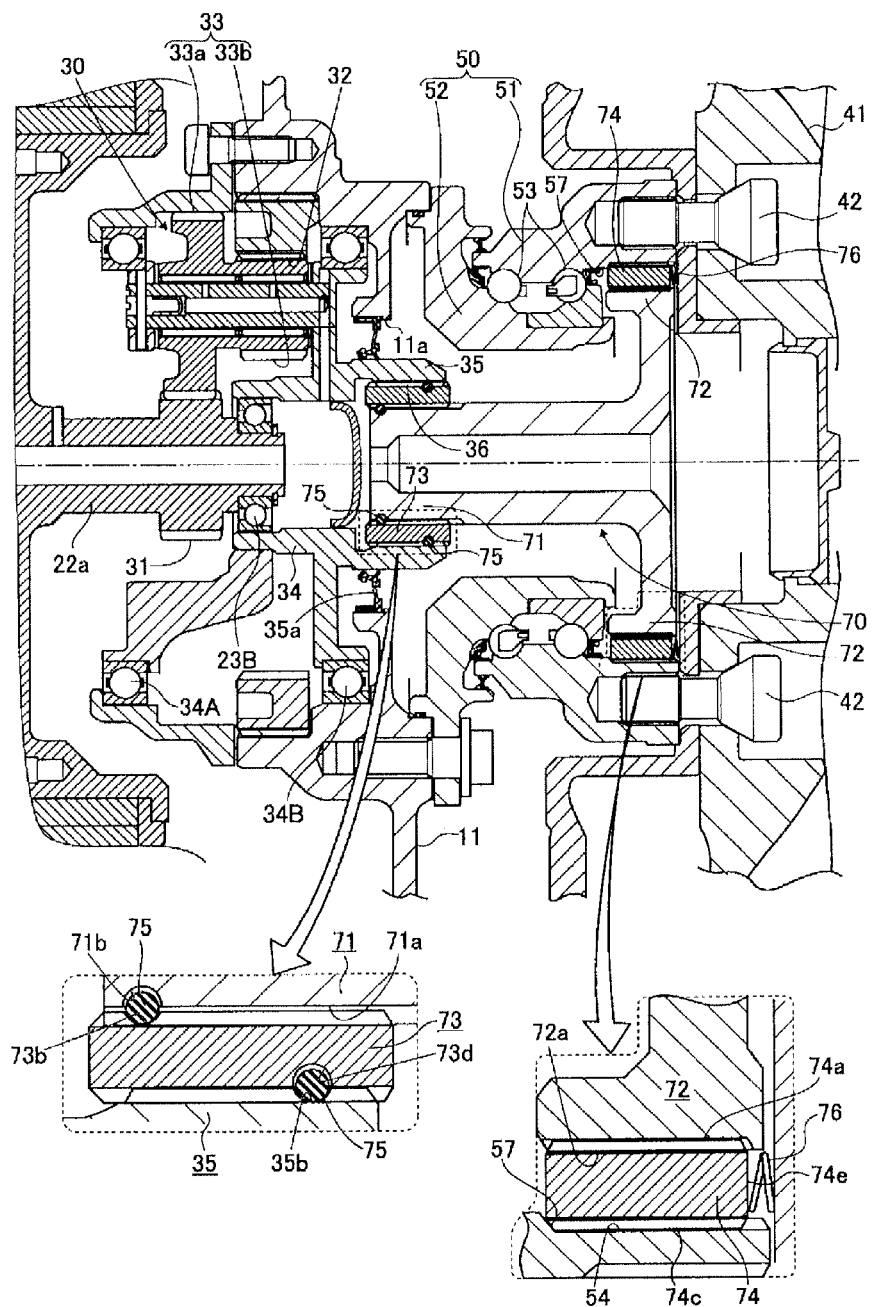
FIG. 5 is an enlarged view showing the main section of the in-wheel motor unit shown in FIG. 4.
Figure 6:
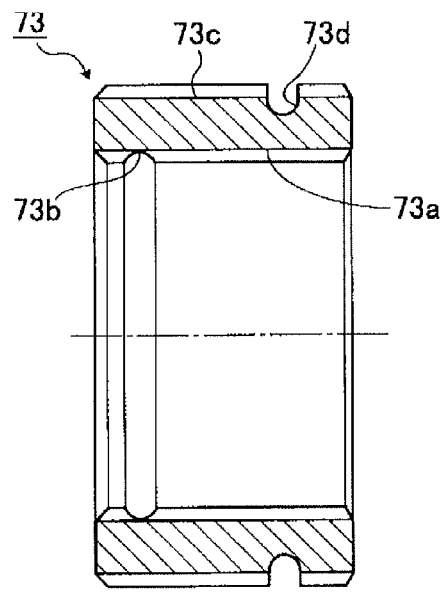
FIG. 6 is a longitudinal cross-sectional view showing a first floating collar.
Figure 7A:
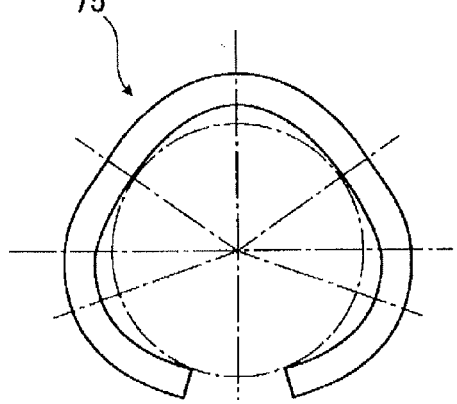
FIG. 7A is a plan view showing a wave ring.
Figure 7B:
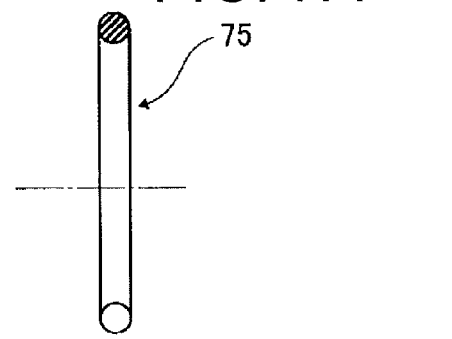
FIG. 7B is a longitudinal cross-sectional view showing a wave ring.

First, the configuration will be described. The basic configuration of the in-wheel motor unit MU1 to which the axle support structure of the second embodiment is applied is similar to that of the first embodiment, and is therefore not described in detail herein. FIG. 4 is a longitudinal cross-sectional view showing an in-wheel motor unit to which the axle support structure of the second embodiment is applied. FIG. 5 is an enlarged view showing the main section of the in-wheel motor unit shown in FIG. 4. FIG. 6 is a longitudinal cross-sectional view showing a first floating collar. FIG. 7A is a plan view showing a wave ring. FIG. 7B is a longitudinal cross-sectional view showing a wave ring.

The in-wheel motor unit MU1 shown in FIG. 4, which is attached to the wheel 41 of the vehicle wheel 40, has a motor case 10, an electric motor (a drive source) 20, and a speed reducer 30.

The output shaft part 35 of the carrier 34 and the outside wheel rotating part 51 of the hub bearing 50 are linked via a floating shaft 70.

In one end of the floating shaft 70 is formed a first linking part 71 linked via a first floating collar 73 with the output shaft part 35 with a degree of freedom in a direction other than the direction of rotation, and in the other end is formed a second linking part 72 linked via a second floating collar 74 with the outside wheel rotating part 51 with a degree of freedom in a direction other than the direction of rotation, as shown in FIG. 5.

The term "degree of freedom in a direction other than the direction of rotation" refers to a degree of freedom in the radial direction, such that the axial directions coincide and there is positional misalignment in parallel, for example; a degree of freedom in an inclined direction such that the axial directions differ; or the like.

The first linking part 71 has an outside diameter capable of fitting with the inner side of the first floating collar 73, and formed in the external peripheral surface are a plurality of grooves 71a composed of serrations and extending in the axial direction, and an annular groove 71b into which a wave ring (elastic member) 75 fits, the annular groove extending in the circumferential direction.

The second linking part 72 has an outside diameter capable of fitting with the inner side of the second floating collar 74, and formed in the external peripheral surface are a plurality of grooves 72a composed of serrations and extending in the axial direction.

The first floating collar 73 has an outside diameter capable of fitting into the inner side of the output shaft part 35, and is composed of a metal cylinder open at both ends, as shown in FIG. 6. Formed in the internal peripheral surface of the first floating collar 73 is an inside connecting part 73a composed of serrations, and a first annular groove 73b into which the wave ring 75 is fitted, the annular groove extending in the circumferential direction. Formed in the external peripheral surface of the first floating collar 73 is an outside connecting part 73c composed of serrations, and a second annular groove 73d into which the wave ring 75 is fitted, the annular groove extending in the circumferential direction.

The inside connecting part 73a, which is composed of concavities and convexities extending in the axial direction and capable of meshing with the grooves 71a of the first linking part 71, is subjected to crowning to form a side surface (not shown) at mid-height to come in contact with the grooves 71a, and is thinned toward the distal end. The first annular groove 73b is a concavity provided to a position facing the annular groove 71b of the first linking part 71.

Due to the grooves 71a of the first linking part 71 and the inside connecting part 73a being coupled through the serrations, the first linking part 71 and the first floating collar 73 are capable of rotating integrally. At this time, the wave ring 75 shown in FIGS. 7A and 7B is fitted into the space formed between the annular groove 71b and the first annular groove 73b.

The wave ring (elastic member) 75 is composed of a substantially annular elastic body with part of the annular shape missing and open as shown in FIG. 7A, and the wave ring has a wave shape in the radial direction. The term "wave shape in the radial direction" refers to a structure in which portions having a large inside diameter and portions having a small inside diameter are alternately disposed.

The outside connecting part 73c, which is composed of concavities and convexities extending in the axial direction and capable of meshing with the first connecting part 36 of the output shaft part 35, is subjected to crowning to form a side surface (not shown) at mid-height to come in contact with the first connecting part 36, and is thinned toward the distal end. The second annular groove 73d is a concavity provided to a position facing an annular groove 35b that extends in the circumferential direction and that is formed in the internal peripheral surface of the output shaft part 35.

Due to the first connecting part 36 of the output shaft part 35 and the outside connecting part 73c being coupled through the serrations, the output shaft part 35 and the first floating collar 73 are capable of rotating integrally. At this time, the wave ring 75 shown in FIGS. 7A and 7B is fitted into the space formed between the annular groove 35b and the second annular groove 73d.

The second floating collar 74 is composed of a metal cylinder that is open at both end and that has an outside diameter that can fit into the outside wheel rotating part 51. Formed in the internal peripheral surface of the second floating collar 74 is an inside connecting part 74a composed of serrations, and formed in the external peripheral surface is an outside connecting part 74c composed of serrations.

The inside connecting part 74a, which is composed of concavities and convexities extending in the axial direction and capable of meshing with the grooves 72a of the second linking part 72, is subjected to crowning to form a side surface (not shown) at mid-height to come in contact with the grooves 72a, and is thinned toward the distal end. Due to the grooves 72a of the second linking part 72 and the inside connecting part 74a being coupled through the serrations, the second linking part 72 and the second floating collar 74 are capable of rotating integrally.

The outside connecting part 74c, which is composed of concavities and convexities extending in the axial direction and capable of meshing with the second connecting part 54 of the outside wheel rotating part 51, is subjected to crowning to form a side surface (not shown) at mid-height to come in contact with the second connecting part 54, and is thinned toward the distal end. Due to the second connecting part 54 of the outside wheel rotating part 51 and the outside connecting part 74c being coupled through the serrations, the outside wheel rotating part 51 and the second floating collar 74 are capable of rotating integrally.

Furthermore, a disk spring (elastic member) 76 for urging the second floating collar 74 toward the electric motor 20 is disposed between the wheel 41 and a vehicle wheel-side end surface 74e of the second floating collar 74 which faces the vehicle wheel 40.

This disk spring 76 causes the second floating collar 74 to be in close contact with a ridge 57 formed between the rolling surface 55 and the second connecting part 54 of the outside wheel rotating part 51.

Figure 8A:
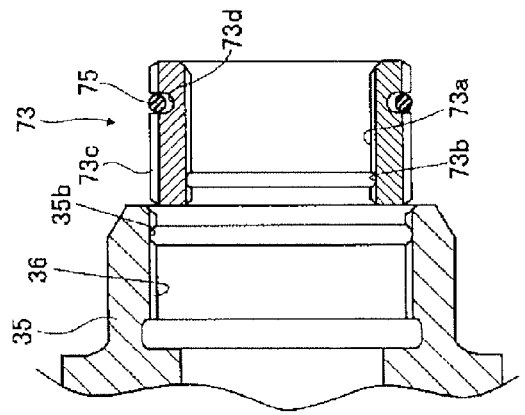
FIG. 8A is an explanatory drawing showing the procedure of assembling the first floating collar, the state before assembly being shown.
Figure 8B:
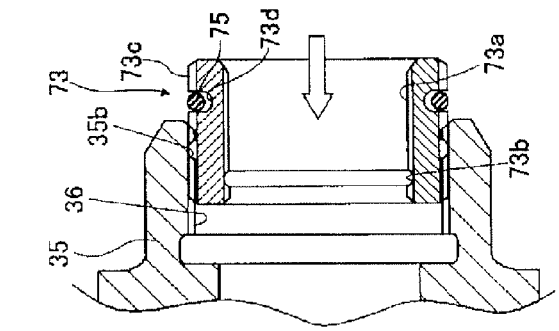
FIG. 8B is an explanatory drawing showing the procedure of assembling the first floating collar, the state at the start of assembly being shown.
Figure 8C:
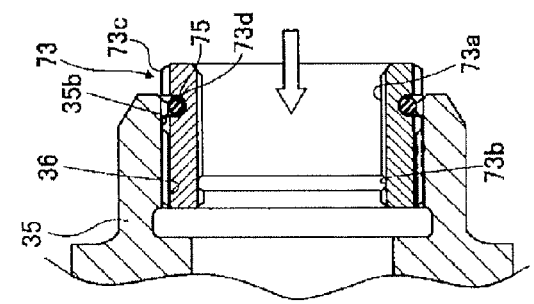
FIG. 8C is an explanatory drawing showing the procedure of assembling the first floating collar, the state at the final stage of assembly being shown.
Figure 8D:
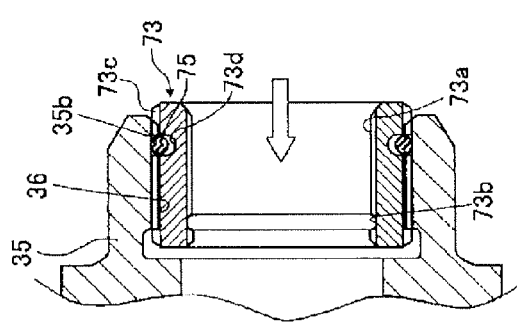
FIG. 8D is an explanatory drawing showing the procedure of assembling the first floating collar, the state at the completion of assembly being shown.

Next is a description of the method of assembling the first floating collar in the axle support structure of the second embodiment. FIGS. 8A to 8D are explanatory drawings showing the procedure of assembling the first floating collar, wherein FIG. 8A shows the state before assembly, FIG. 8B shows the initial state of assembly, FIG. 8C shows the state at the final stage of assembly, and FIG. 8D shows the state at the completion of assembly.

To assemble the first floating collar 73 on the output shaft part 35, the output shaft part 35 and the first floating collar 73 are first made to coaxially face each other as shown in FIG. 8A. At this time, the wave ring 75 is fitted in advance into the second annular groove 73d of the first floating collar 73.

Next, the first floating collar 73 is moved in the axial direction and inserted into the output shaft part 35 so that the first connecting part 36 of the output shaft part 35 and the outside connecting part 73c of the first floating collar 73 are coupled through the serrations, as shown in FIG. 8B.

When the first floating collar 73 continues to be inserted in this state, the wave ring 75 is pushed into the second annular groove 73d by the first connecting part 36 when the first connecting part 36 of the output shaft part 35 and the second annular groove 73d face each other as shown in FIG. 8C. The insertion of the first floating collar 73 can thereby be continued smoothly.

Lastly, when the annular groove 35b formed in the output shaft part 35 and the second annular groove 73d face each other as shown in FIG. 8D, the insertion is stopped and the assembly of the first floating collar 73 is complete.

Next, the action will be described. In the axle support structure of the second embodiment, "shaft wobble," in which the outside wheel rotating part 51 whirls, is thought to occur due to excessive external force being inputted to the hub bearing 50 via the vehicle wheel 40.

At this time, the outside wheel rotating part 51 is linked to the outside connecting part 74c of the second floating collar 74, and the second linking part 72 of the floating shaft 70 is linked to the inside connecting part 74a of the second floating collar 74.

Therefore, even when shaft wobble of the outside wheel rotating part 51 occurs, it is absorbed by the alternating between the linked state with the outside connecting part 74c and the linked state with the inside connecting part 74a, and the shaft wobble can be prevented from being transmitted to the output shaft part 35 linked to the other end of the floating shaft 70.

Specifically, interposing the second floating collar 74 makes it possible to alternate between the respective linked states with the internal and external peripheral surfaces of the second floating collar 74, the degree of freedom in the movement of the floating shaft 70 can therefore be greatly increased, and large shaft wobble can be dealt with.

Furthermore, the first linking part 71 of the floating shaft 70 is linked to the first connecting part 36 via the first floating collar 73. In other words, the first linking part 71 of the floating shaft 70 is linked to the inside connecting part 73a of the first floating collar 73, and the first connecting part 36 of the output shaft part 35 is linked to the outside connecting part 73c of the first floating collar 73.

Therefore, the shaft wobble can be absorbed despite the alternating between the linked state in the inside connecting part 73a of the first floating collar 73 and the linked state in the outside connecting part 74c, and the shaft wobble can be further prevented from being transmitted to the output shaft part 35.

In the axle support structure of the second embodiment, the wave ring 75, which is an elastic member, is interposed between the first linking part 71 and the first floating collar 73, and also between the first floating collar 73 and the output shaft part 35. The disk spring 76, which is an elastic member, is interposed between the second floating collar 74 and the wheel 41.

The first linking part 71 is thereby urged toward the output shaft part 35 via the first floating collar 73. Due to the second floating collar 74 being urged toward the outside wheel rotating part 51, the second linking part 72 coupled through serrations with the second floating collar 74 is urged toward the outside wheel rotating part 51.

Therefore, rattling of the first floating collar 73 is suppressed by the urging force of the wave ring 75, despite the alternating between the linked state in the inside connecting part 73a of the first floating collar 73 and the linked state in the outside connecting part 74c, caused by the shaft wobble of the outside wheel rotating part 51. Rattling of the second floating collar 74 is also suppressed by the urging force of the disk spring 76, despite the occurrence of shaft wobble of the outside wheel rotating part 51 and the alternating between the linked state in the inside connecting part 74a of the second floating collar 74 and the linked state in the outside connecting part 74c.

Acoustic vibration performance can thereby be improved, and the occurrence of "clattering" noises can be prevented, which occur due to the floating shaft 70 and the first and second floating collars 73, 74 moving.

Next, the effects will be described. The effects presented below can be achieved in the axle support structure of the second embodiment.

(6) A first floating collar 73 is interposed between the drive source output shaft (output shaft part) 35 and the first linking part 71, and a second floating collar 74 is interposed between the axle (outside wheel rotating part) 51 and the second linking part 72; and the serrations are provided to an internal peripheral surface (inside connecting part) 73a and external peripheral surface (outside connecting part) 73c of the first floating collar 73, and an internal peripheral surface (inside connecting part) 74a and external peripheral surface (outside connecting part) 74c of the second floating collar 74. Therefore, the degree of freedom in linking the first linking part 61 and the degree of freedom in linking the second linking part 62 can be further increased, the degree of freedom in moving the floating shaft 70 can be greatly increased, and large shaft wobble can be dealt with.

(7) The floating shaft 70 has an elastic member (wave ring) 75 for urging the first linking part 71 toward the drive source output shaft (output shaft part) 35, and/or an elastic member (disk spring) 76 for urging the second linking part 72 toward the axle (outside wheel rotating part) 51. Therefore, the acoustic vibration performance when shaft wobble occurs can be improved, and the occurrence of "clattering" noises can be prevented, which occur due to the floating shaft 70 and the first and second floating collars 73, 74 moving.

Third Embodiment

The third embodiment is an example of an axle support structure that can regulate the whirling of the floating shaft.

Figure 9:
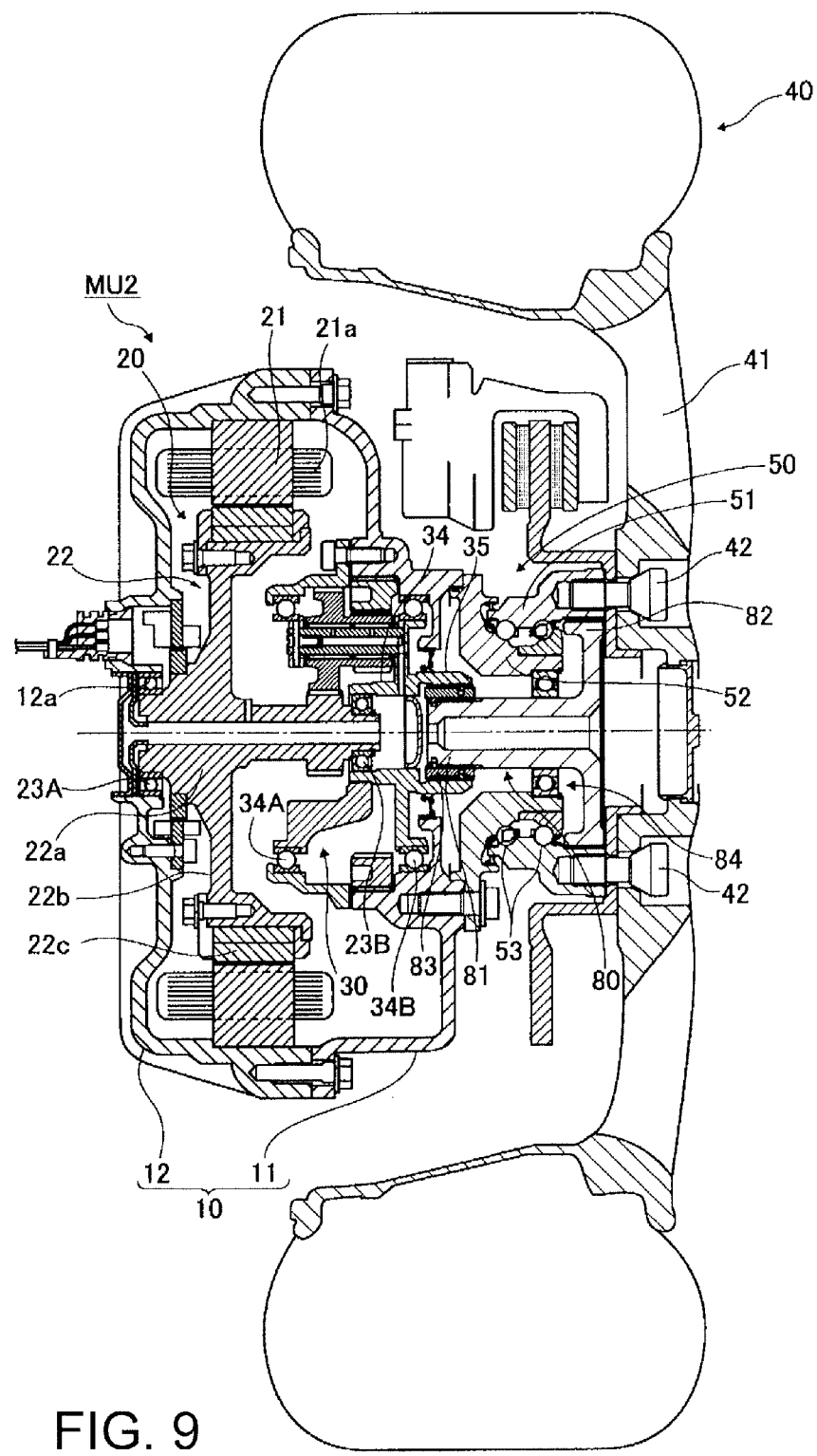
FIG. 9 is a longitudinal cross-sectional view showing an in-wheel motor unit to which the axle support structure of a third embodiment is applied.
Figure 10:
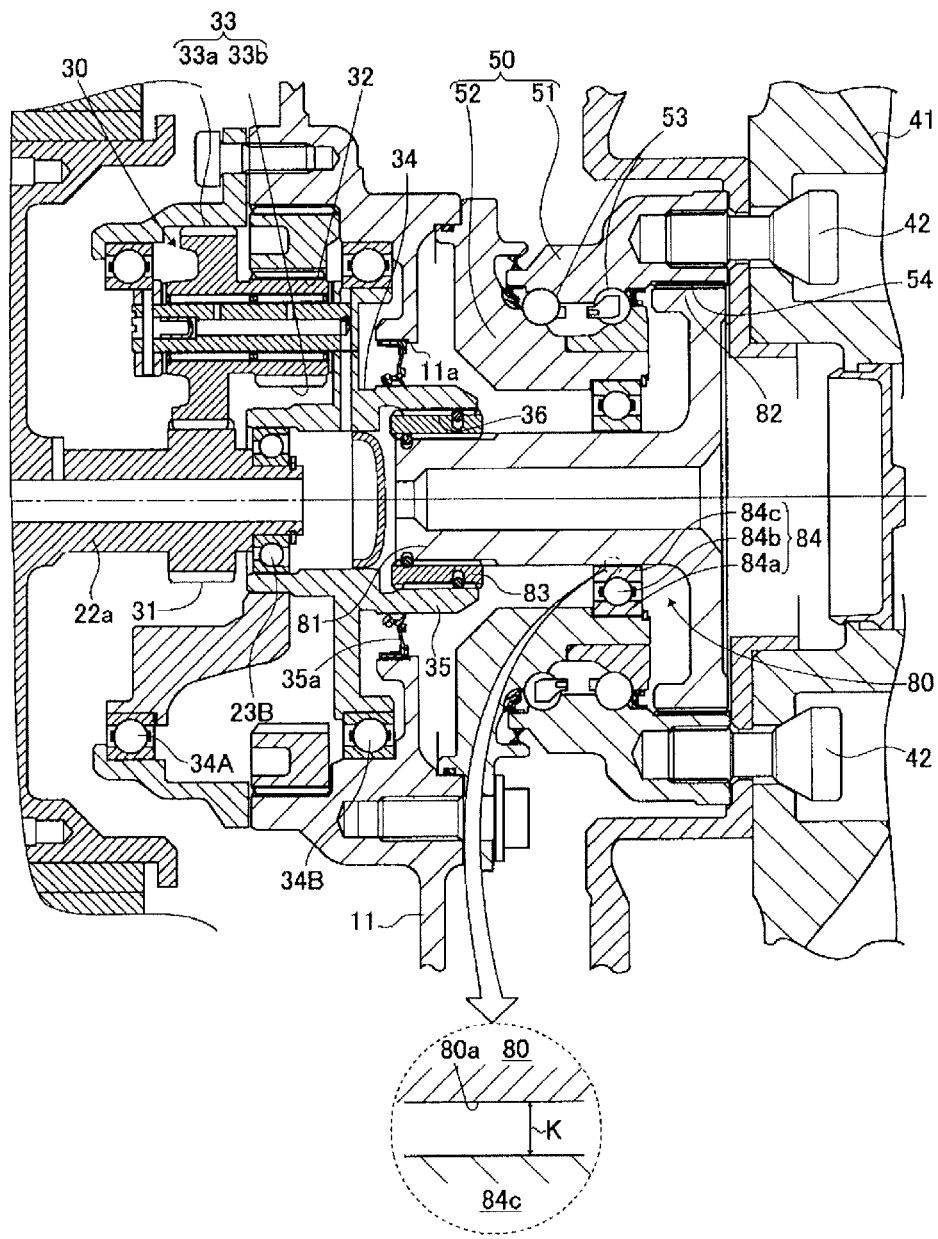
FIG. 10 is an enlarged view showing the main section of the in-wheel motor unit shown in FIG. 9.

First, the configuration will be described. The basic configuration of the in-wheel motor unit MU2 to which the axle support structure of the third embodiment is applied is similar to that of the first embodiment, and is therefore not described in detail herein. FIG. 9 is a longitudinal cross-sectional view showing an in-wheel motor unit to which the axle support structure of the third embodiment is applied. FIG. 10 is an enlarged view showing the main section of the in-wheel motor unit shown in FIG. 9.

The in-wheel motor unit MU2 shown in FIG. 9, which is attached to a wheel 41 of a vehicle wheel 40, has a motor case 10, an electric motor (drive source) 20, and a speed reducer 30. The output shaft part 35 of the carrier 34 and the outside wheel rotating part 51 of the hub bearing 50 are linked via a floating shaft 80.

Formed in one end of this floating shaft 80 is a first linking part 81 linked via a first floating collar 83 with the output shaft part 35 with a degree of freedom in a direction other than the direction of rotation, and formed in the other end is a second linking part 82 linked with the outside wheel rotating part 51 with a degree of freedom in a direction other than the direction of rotation, as shown in FIG. 10.

The term "degree of freedom in a direction other than the direction of rotation" refers to a degree of freedom in the radial direction, such that the axial directions coincide and there is positional misalignment in parallel, for example; a degree of freedom in an inclined direction such that the axial directions differ; or the like, similar to the first embodiment and the second embodiment.

The configuration of the first linking part 81 and the first floating collar 83 are the same as in the second embodiment, and are therefore not described in detail. The configuration of the second linking part 82 is also the same as in the first embodiment and is therefore not described in detail.

In the third embodiment, an auxiliary bearing 84 is provided to the inside wheel fixed part 52 of the hub bearing 50, which faces the intermediate part of the floating shaft 80.

The auxiliary bearing 84 is a shaft support part that faces the external peripheral surface 80a of the floating shaft 80 with a predetermined gap K therebetween in the radial direction, and that regulates the whirling of the floating shaft 80.

The auxiliary bearing 84 has an outer member 84a fixed to the inside wheel fixed part 52, and an inner member 84c pivotally held in the outer member 84a via a rolling element 84b. When the floating shaft 80 comes in contact, the auxiliary bearing 84 thereby rotatably supports the floating shaft 80 relative to the inside wheel fixed part 52 fixed to the case main body 11, which is a vehicle body-side member.

The predetermined gap K is thereby formed between the auxiliary bearing 84 and the floating shaft 80 in normal states in which there are no abnormalities in the hub bearing 50 and the axial direction of the floating shaft 80 and the axial direction of the output shaft part 35 coincide. Therefore, the floating shaft 80 does not come in contact with the auxiliary bearing 84.

The floating shaft 80 whirls when any abnormality occurs in the hub bearing 50, rattling occurs in the outside wheel rotating part 51, and the axial direction of the floating shaft 80 is misaligned from the axial direction of the output shaft part 35. Therefore, the external peripheral surface 80a of the floating shaft 80 comes in contact with the inner member 84c of the auxiliary bearing 84.

At this time, the outer member 84a of the auxiliary bearing 84 does not move because the outer member is provided to the inside wheel fixed part 52 fixed to the case main body 11. Therefore, the floating shaft 80 rotates together with the inner member 84c of the auxiliary bearing 84 and whirls within the range of the inside diameter of the auxiliary bearing 84. As a result, the amount of displacement in the first linking part 81 of the floating shaft 80 is regulated, and damage to the first linking part 81 can be prevented.

Furthermore, when the floating shaft 80 comes in contact with the auxiliary bearing 84, some of the load inputted from the vehicle wheel 40 can be supported by the auxiliary bearing 84. The load from the vehicle wheel 40 supported by the hub bearing 50 is thereby reduced, and the rattling in the hub bearing 50 can be kept from progressing.

Specifically, the auxiliary bearing 84 supports the floating shaft 80, whereby the load capacity of the hub bearing 50 increases. The effect of keeping the rattling from progressing can thereby be expected.

The effects presented below can be achieved in the axle support structure of the third embodiment.

(8) The vehicle body-side member (inside wheel fixed part) 52 pivotally provided to the vehicle body is provided with a shaft support part (auxiliary bearing) 84 that faces the external peripheral surface 80a of the floating shaft 80 with a predetermined gap K therebetween in the radial direction, and that regulates the whirling of the floating shaft 80. Therefore, when the floating shaft 80 whirls, the amount of displacement in the first linking part 81 of the floating shaft 80 is regulated, and damage to the first linking part 81 can be prevented.

(9) The shaft support part is configured from an auxiliary bearing 84 for rotatably supporting the floating shaft 80 relative to the vehicle body-side member (inside wheel fixed part) 52 when the floating shaft 80 comes in contact. Therefore, due to the auxiliary bearing 84 coming in contact with the floating shaft 80, some of the load inputted from the vehicle wheel 40 is supported by the auxiliary bearing 84, the load from the vehicle wheel 40 supported by the hub bearing 50 is reduced, and the rattling in the hub bearing 50 can be kept from progressing.

Fourth Embodiment

The fourth embodiment is an example of an axle support structure in which the whirling of the floating shaft is regulated by a metal bearing.

Figure 11:
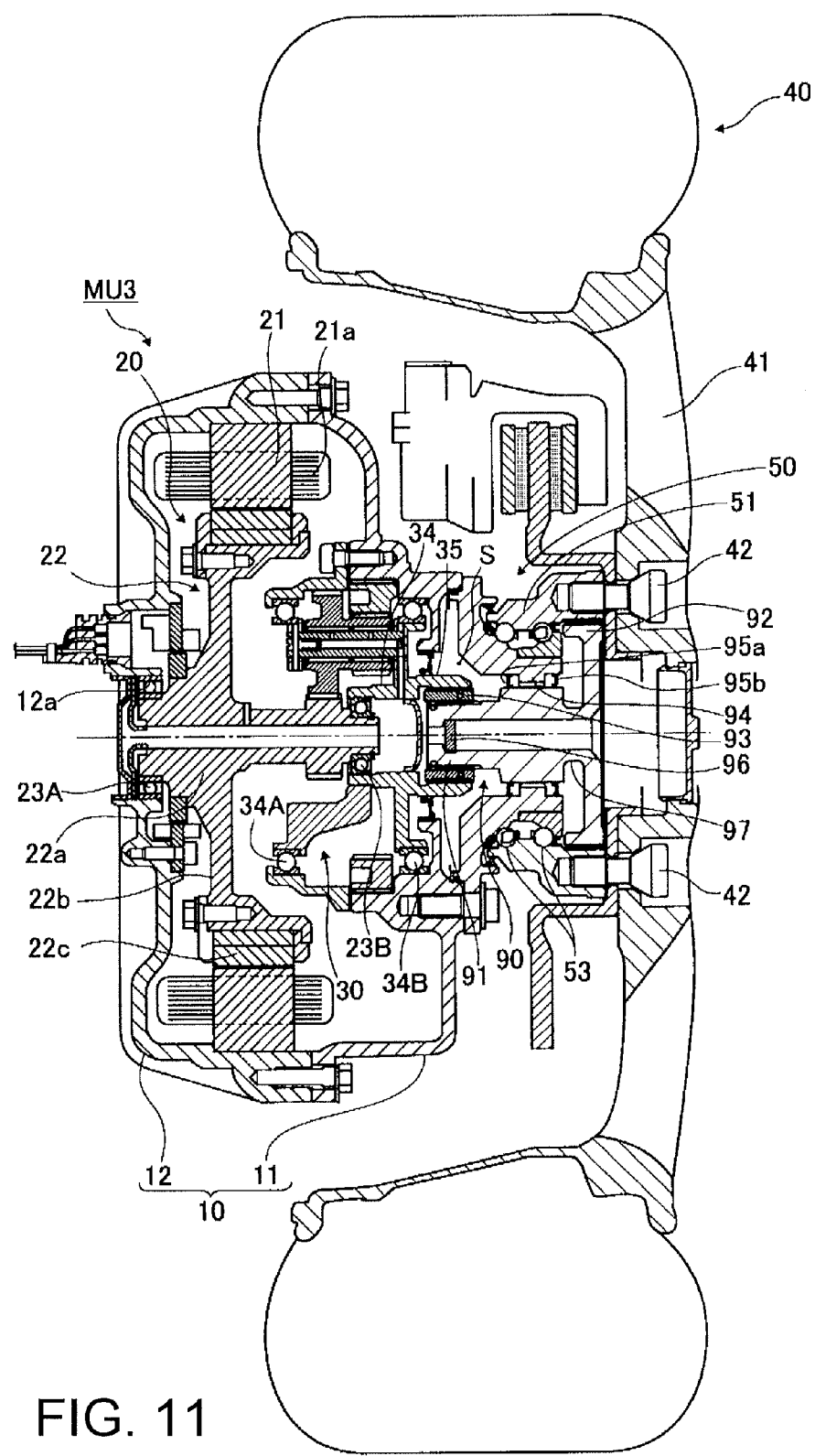
FIG. 11 is a longitudinal cross-sectional view showing an in-wheel motor unit to which the axle support structure of a fourth embodiment is applied.
Figure 12:
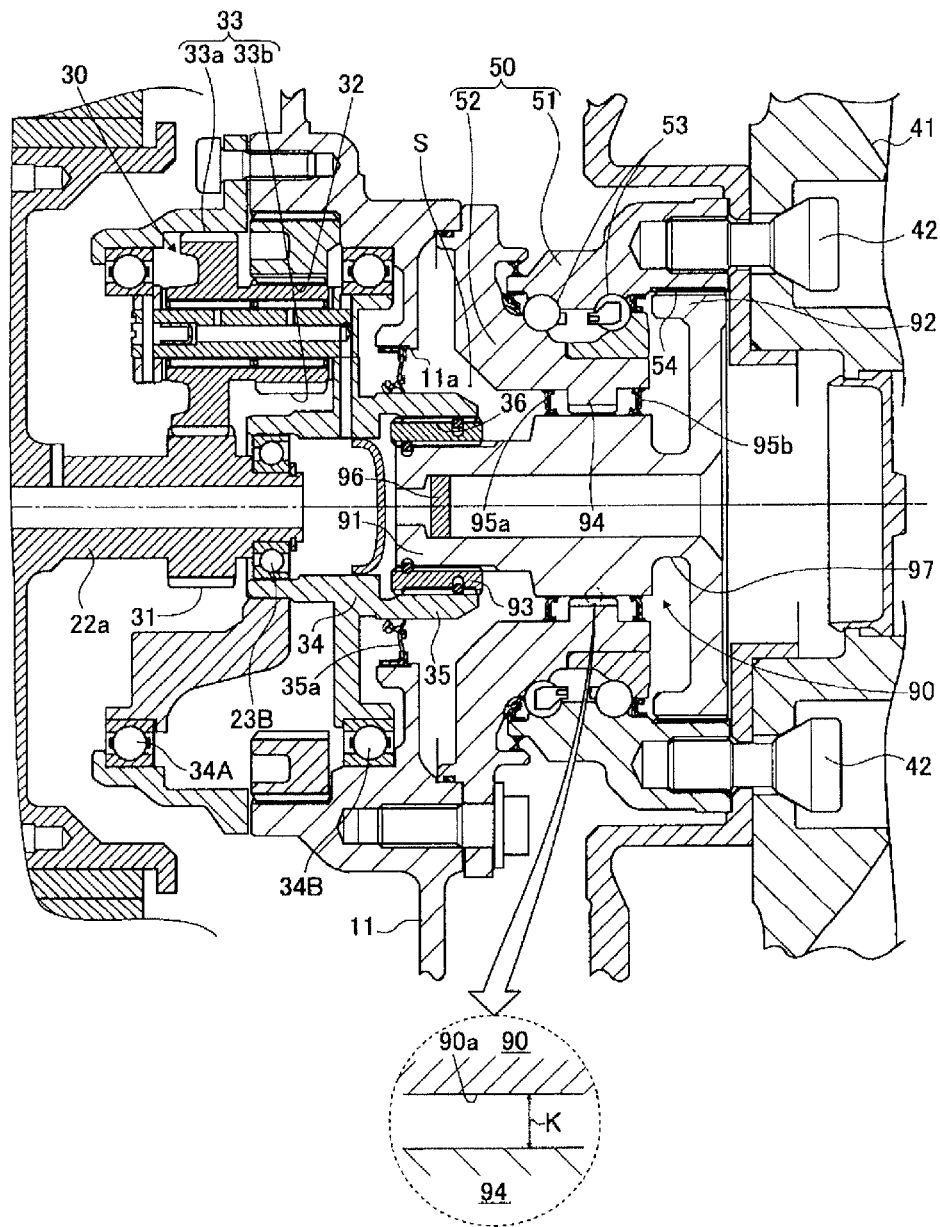
FIG. 12 is an enlarged view showing the main section of the in-wheel motor unit shown in FIG. 11.

First, the configuration will be described. The basic configuration of the in-wheel motor unit MU3 to which the axle support structure of the fourth embodiment is applied is similar to that of the first embodiment, and is therefore not described in detail herein. FIG. 11 is a longitudinal cross-sectional view showing an in-wheel motor unit to which the axle support structure of the fourth embodiment is applied. FIG. 12 is an enlarged view showing the main section of the in-wheel motor unit shown in FIG. 11.

The in-wheel motor unit MU3 shown in FIG. 11, which is attached to a wheel 41 of a vehicle wheel 40, has a motor case 10, an electric motor (drive source) 20, and a speed reducer 30. The output shaft part 35 of the carrier 34 and the outside wheel rotating part 51 of the hub bearing 50 are linked via a floating shaft 90.

Formed in one end of this floating shaft 90 is a first linking part 91 linked via a first floating collar 93 with the output shaft part 35 with a degree of freedom in a direction other than the direction of rotation, and formed in the other end is a second linking part 92 linked with the outside wheel rotating part 51 with a degree of freedom in a direction other than the direction of rotation, as shown in FIG. 12.

The term "degree of freedom in a direction other than the direction of rotation" refers to a degree of freedom in the radial direction, such that the axial directions coincide and there is positional misalignment in parallel, for example; a degree of freedom in an inclined direction such that the axial directions differ; or the like, similar to the first to third embodiments.

The configuration of the first linking part 91 and the first floating collar 93 are the same as in the second embodiment, and are therefore not described in detail. The configuration of the second linking part 92 is also the same as in the first embodiment and is therefore not described in detail.

In the fourth embodiment, a metal bearing 94 is integrally provided to the inside wheel fixed part 52 of the hub bearing 50, which faces the intermediate part of the floating shaft 90.

The metal bearing 94 is a shaft support part that faces the external peripheral surface 90a of the floating shaft 90 with a predetermined gap K therebetween in the radial direction, and that regulates the whirling of the floating shaft 80; and is also an auxiliary bearing that rotatably supports the floating shaft 90 relative to the inside wheel fixed part 52 when in contact with the floating shaft 90.

An annular first oil seal 95a and second oil seal 95b for closing the space between the floating shaft 90 and the inside wheel fixed part 52 are provided to positions in front of and behind the metal bearing 94 in the axial direction. Furthermore, grease is enclosed between the first and second oil seals 95a, 95b in order to prevent burning when the floating shaft 90 and the metal bearing 94 come in contact.

An annular oil seal 35a is provided between the external peripheral side of the output shaft part 35 and the opening 11a of the case main body 11, and an annular first oil seal 95a is provided between the floating shaft 90 and the inside wheel fixed part 52, whereby the space S between the oil seal 35a and the first oil seal 95a is closed up. Therefore, because the pressure in the space S fluctuates due to temperature changes, an air filter 96 is installed inside the floating shaft 90 as a relief structure for communicating the space S and external space.

Furthermore, the floating shaft 90 in the axle support structure of the fourth embodiment has a weakest part 97, which is weakest relative to the bending direction load of the floating shaft 90, provided between the metal bearing 94 and the second linking part 92.

The term "weakest part" refers to a location that deforms the most readily in response to loads in the bending direction acting on the floating shaft 90, and the weakest part herein is formed by making the diameter of the floating shaft 90 the smallest.

In the axle support structure of the third embodiment, the metal bearing 94 facing the floating shaft 90 with a predetermined gap K therebetween is provided integrally to the inside wheel fixed part 52 of the hub bearing 50, whereby the metal bearing 94 and the floating shaft 90 come in contact when the floating shaft 90 whirls due to abnormalities in the hub bearing 50. The whirling of the floating shaft 90 is thereby regulated and the load acting on the hub bearing 50 is supported by the metal bearing 94, whereby the load on the hub bearing 50 can be reduced.

The shaft support part for regulating the whirling of the floating shaft 90 is configured from the metal bearing 94, and the load support capacity can thereby be increased relative to a regular ball bearing such as the auxiliary bearing 84 shown in the third embodiment, without any change to the dimension in the radial direction. As a result, the outside diameter of the hub bearing 50 can be relatively small, and the dimension in the radial direction can be reduced.

Furthermore, the space S between the oil seal 35a and the first oil seal 95a can be closed up by providing the first and second oil seals 95a, 95b to both sides in the axial direction of the metal bearing 94. Therefore, the space S is separated from the external space, muddy water and the like can be prevented from getting into the space S, and the cleanliness of the unit interior can be improved. Pressure fluctuations in the space S can be alleviated by causing the space S to communicate with the external space via the air filter 96.

Even though the metal bearing 94 and the floating shaft 90 come in contact and the shaft wobble of the outside wheel rotating part 51 of the hub bearing 50 whirling is regulated by the metal bearing 94, the weakest part 97 deforms under the load in the bending direction acting on the floating shaft 90 when there is a large amount of shaft wobble, such that the shaft wobble increases. The shaft wobble transmitted to the first connecting part 36 of the output shaft part 35 can thereby be alleviated. It is then possible to prevent damage caused by excessive input going to components farther upstream than the output shaft part 35, such as the speed reducer 30; i.e. to the electric motor 20 which is the drive source.

The effects presented below can be achieved in the axle support structure of the fourth embodiment.

(10) The auxiliary bearing is configured from a metal bearing 94. Therefore, the load support capacity can be increased above that of a regular ball bearing without any change to the dimension in the radial direction, and the outside diameter of the hub bearing 50 can be made relatively small to reduce the dimension in the radial direction.

(11) A weakest part relative to the bending direction load of the floating shaft is provided between the shaft support part (metal bearing) 94 and the second linking part 92 of the floating shaft 90. Therefore, even though shaft wobble is regulated by the metal bearing 94 and even when a large amount of shaft wobble occurs such that the shaft wobble increases, the shaft wobble transmitted to the first connecting part 36 of the output shaft part 35 can be alleviated by the deforming of the weakest part 97. It is then possible to prevent damage caused by excessive input to components farther upstream than the output shaft part 35 such as the speed reducer 30.

Fifth Embodiment

The fifth embodiment is an example of an axle support structure in which the first linking part of the floating shaft is taken into the motor case with the use of a partitioning wall.

Figure 13:
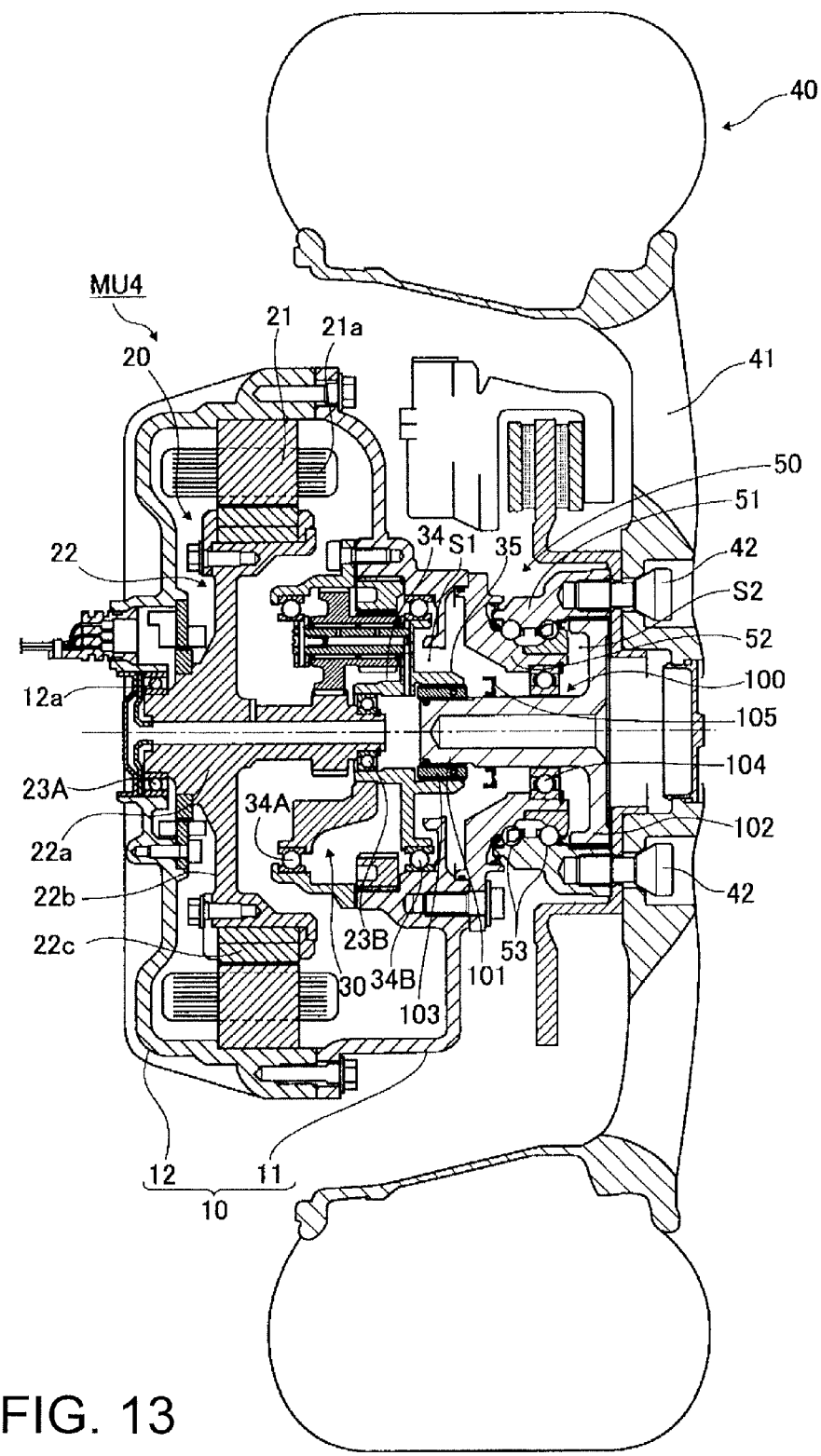
FIG. 13 is a longitudinal cross-sectional view showing an in-wheel motor unit to which the axle support structure of a fifth embodiment is applied.
Figure 14:
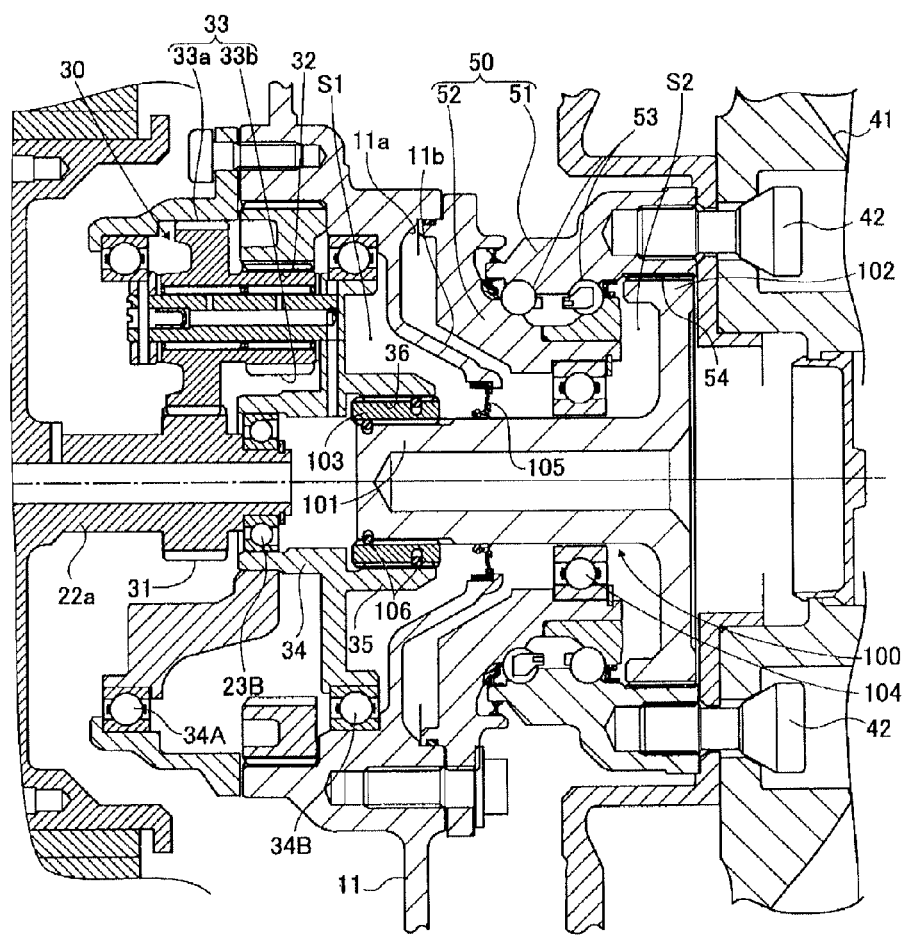
FIG. 14 is an enlarged view showing the main section of the in-wheel motor unit shown in FIG. 13.

First, the configuration will be described. The basic configuration of the in-wheel motor unit MU4 to which the axle support structure of the fifth embodiment is applied is similar to that of the first embodiment, and is therefore not described in detail herein. FIG. 13 is a longitudinal cross-sectional view showing an in-wheel motor unit to which the axle support structure of the fifth embodiment is applied. FIG. 14 is an enlarged view showing the main section of the in-wheel motor unit shown in FIG. 13.

The in-wheel motor unit MU4 shown in FIG. 13, which is attached to a wheel 41 of a vehicle wheel 40, has a motor case 10, an electric motor (drive source) 20, and a speed reducer 30. The output shaft part 35 of the carrier 34 and the outside wheel rotating part 51 of the hub bearing 50 are linked via a floating shaft 100.

Formed in one end of this floating shaft 100 is a first linking part 101 linked via a first floating collar 103 with the output shaft part 35 with a degree of freedom in a direction other than the direction of rotation, and formed in the other end is a second linking part 102 linked with the outside wheel rotating part 51 with a degree of freedom in a direction other than the direction of rotation, as shown in FIG. 14. An auxiliary bearing 104 is provided to the inside wheel fixed part 52 of the hub bearing 50 which faces the middle part of the floating shaft 100.

The term "degree of freedom in a direction other than the direction of rotation" refers to a degree of freedom in the radial direction, such that the axial directions coincide and there is positional misalignment in parallel, for example; a degree of freedom in an inclined direction such that the axial directions differ; or the like, similar to the first to fourth embodiments.

The configuration of the first linking part 101 and the first floating collar 103 are the same as in the second embodiment, and are therefore not described in detail. The configuration of the second linking part 102 is also the same as in the first embodiment and is therefore not described in detail. The configuration of the floating shaft 100 and the configuration of the auxiliary bearing 104 are also the same as in the third embodiment and are therefore not described in detail.

In the fifth embodiment, the external periphery of the intermediate part of the floating shaft 100 is provided with an annular oil seal 105 for closing off the space formed with a dividing wall 11b extending diametrically inward from the opening 11a of the case main body 11.

The oil seal 105, which is stored in the motor case 10, prevents the oil used to cool the electric motor 20 and to lubricate the speed reducer 30 from leaking out. The oil seal 105 and the dividing wall 11b constitute a partitioning wall extending in the radial direction from the intermediate part of the floating shaft 100, and partitioning the floating shaft into an area S1 where the first linking part 101 is disposed and an area S2 where the second linking part 102 is disposed.

In the axle support structure of the fifth embodiment, the external periphery of the intermediate part of the floating shaft 100 is provided with the annular oil seal 105 for closing off the space formed with the dividing wall 11b, whereby the first linking part 101 linked with the first connecting part 36 of the output shaft part 35 is disposed inside the motor case 10.

Therefore, the first linking part 101 and the first floating collar 103 can be lubricated by the oil accommodated within the motor case 10. As a result, it is possible to prevent the first linking part 101 and the first floating collar 103 from coming in contact with muddy water or the like, rust from occurring, and the shaft wobble absorbing function from decreasing. By lubricating with oil, it is also possible to reduce wear in portions such as the wave ring 106 fitted with the first floating collar 103, the portion of contact between the first linking part 101 and the first floating collar 103, and the portion where the first floating collar 103 and the first connecting part 36 connect. Maintenance of the first linking part 101 and the first floating collar 103 is thereby made easier.

The effects presented below can be achieved in the axle support structure of the fifth embodiment.

(12) The floating shaft 100 has a partitioning wall (dividing wall 11b, oil seal 105) extending in the radial direction from an intermediate part, and partitioning the floating shaft into an area S1 where the first linking part 101 is disposed and an area S2 where the second linking part 102 is disposed. Therefore, the first linking part 101 can be lubricated by the oil stored in the side having the output shaft part 35 which is the drive source output shaft, wear of the first linking part 101 can be reduced, and maintenance can be made easier.

The axle support structure of the present invention is described above based on the first to fifth embodiments, but the specific configuration is not limited to these embodiments, and alterations, additions, and other changes to the design are allowable so long as they do not deviate from the scope of the invention according to the patent claims.

The Third and fourth embodiments have a bearing structure in which a shaft support part rotatably supports the floating shaft relative to any vehicle body-side member, such as the auxiliary bearing 84 being provided as a shaft support part for regulating the whirling of the floating shaft 80 in the third embodiment, and the metal bearing 94 being provided as a shaft support part in the fourth embodiment.

Figure 15:
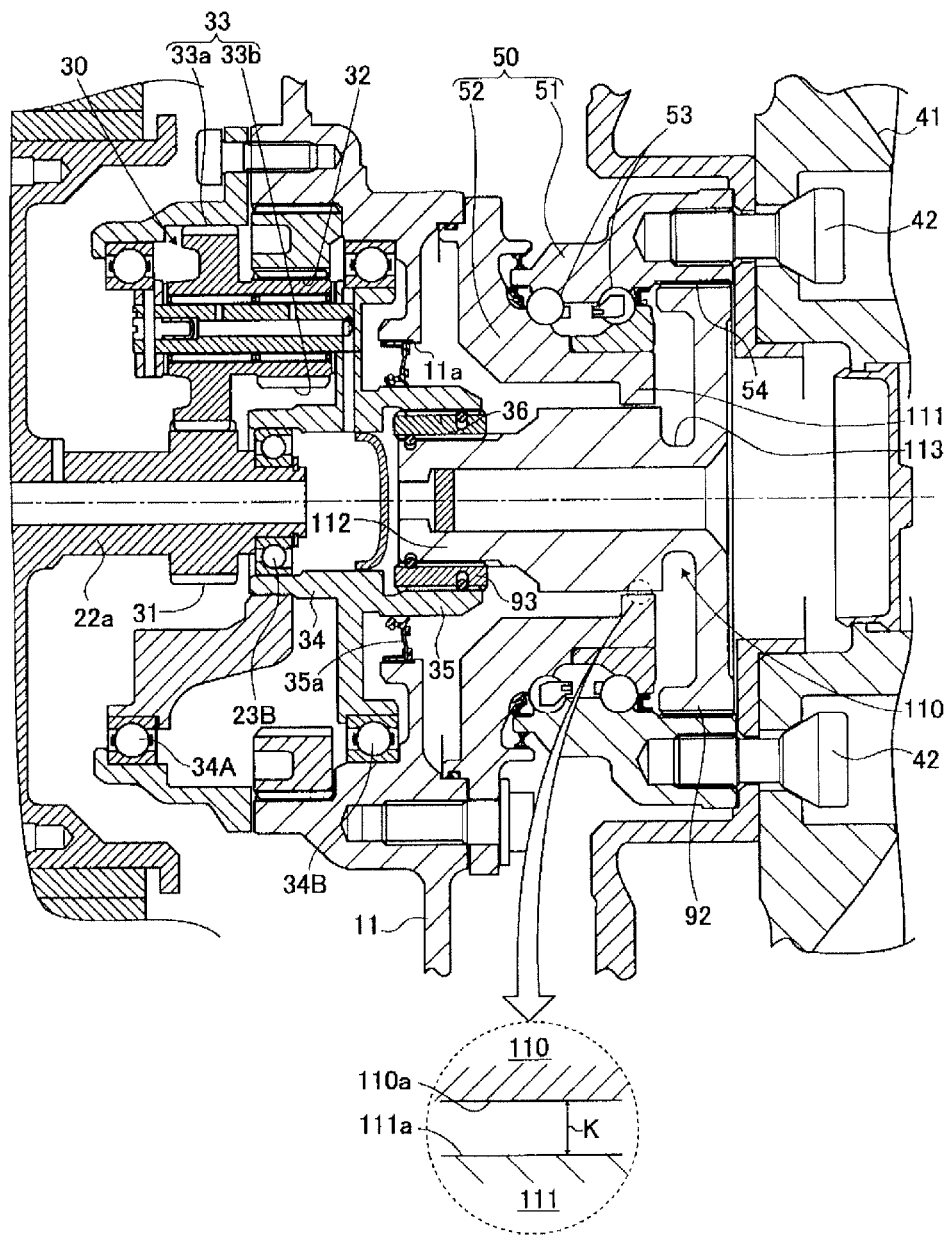
FIG. 15 is an enlarged view showing the main section of an in-wheel motor unit to which the axle support structure of a sixth embodiment is applied.

However, the invention is not limited as such; the shaft support part may be an annular regulating wall 111 protruding toward a floating shaft 110 from the inside wheel fixed part 52 of the hub bearing 50 fixed to the case main body 11, which is a vehicle body-side member, as shown in FIG. 15, for example. This regulating wall 111 has an internal peripheral surface 111a that faces the external peripheral surface 110a of the floating shaft 110 across a predetermined gap K in the radial direction.

This regulating wall 111 causes the external peripheral surface 110a of the floating shaft 110 to come in contact with the regulating wall 111 even when the outside wheel rotating part 51 is jarred by abnormalities in the hub bearing 50 and the floating shaft 110 whirls. Due to this regulating wall 111, the floating shaft 110 whirls within the range of the inside diameter of the regulating wall 111, the amount of displacement in the first linking part 112 of the floating shaft 110 is regulated, and damage to the first linking part 112 can be prevented.

Furthermore, even if the whirling of the floating shaft 110 increases, the load acts on the weakest part 113 with the regulating wall 111 as a fulcrum; therefore, the weakest part 113 is deformed, and shaft wobble can be prevented from being transmitted to the first linking part 112.

Because the regulating wall 111 is fixed to the case main body 11 which does not rotate, abnormal sounds occur and friction increases upon contact with the rotating floating shaft 110. Thus, the effect of warning the driver of abnormalities can be expected by proactively causing and increasing abnormal sounds and friction.

In the second embodiment, the first floating collar 73 is interposed between the floating shaft 70 and the output shaft part 35, and the second floating collar 74 is interposed between the floating shaft 70 and the outside wheel rotating part 51. However, another option is to provide a first floating collar only to the first linking part which requires a comparatively large degree of freedom, i.e. leeway in the incline angle, as in the third embodiment, for example.

In the second embodiment, wave rings 75 which are elastic members are disposed between the first floating collar 73 and the floating shaft 70, and between the first floating collar 73 and the output shaft part 35, and a disk spring 76 which is an elastic member is disposed between the second floating collar 74 and the wheel 41. However, the positions where the elastic members are disposed are not limited to these; the elastic members are not absolutely necessary, nor is the material of the elastic members limited to wave rings or disk springs.

In the above embodiments, examples were presented in which the axle support structure was applied to an in-wheel motor unit, but the present invention is not limited as such. If the vehicle has a drive source output shaft rotated by a drive source, and an axle disposed coaxially with the drive source output shaft and rotated integrally with the vehicle wheel, the axle support structure can generally be applied to vehicles such as engine automobiles, hybrid automobiles, and electric automobiles that travel by means of a single drive motor.

The vehicle body-side member is not limited to the case main body 11, and may be a training arm or the like extending in a pivotal manner from the vehicle body. The vehicle body-side member is not limited to the outside wheel rotating part 51, and may be an axle connected to the vehicle wheel, a wheel hub fitted with the vehicle wheel, or the like.

The invention claimed is:

1. An axle support structure comprising:
a drive source output shaft configured to be rotated in a rotational direction by a drive source;
an axle disposed coaxially with the drive source output shaft and configured to rotate integrally with a vehicle wheel;
a vehicle body-side member that is configured to be pivotally coupled to the vehicle body;
a vehicle wheel bearing coupled to the axle for rotatably supporting the axle on the vehicle body-side member; and
a floating shaft having a first linking part linked with the drive source output shaft with a degree of freedom in a direction other than the-rotational direction, and a second linking part linked with the axle with a degree of freedom in a direction other than the rotational direction, such that power is transmitted from the drive source output shaft to the axle, the vehicle wheel bearing being disposed axially between the first linking part and the second linking part with respect to an axial direction of the floating shaft.

2. The axle support structure according to claim 1, further comprising:
a speed reducer configured to be disposed between an electric motor as the drive source and the drive source output shaft, and
the floating shaft having serrations provided to at least one of the first linking part and the second linking part.

3. The axle support structure according to claim 2, further comprising:
a first floating collar is interposed between the drive source output shaft and the first linking part, and a second floating collar is interposed between the axle and the second linking part; and
the serrations being provided to an internal peripheral surface and an external peripheral surface of the first floating collar, and an internal peripheral surface and an external peripheral surface of the second floating collar.

4. The axle support structure according to claim 2, wherein the second linking part has a larger diameter than a diameter of the first linking part.

5. The axle support structure according to claim 2, wherein the vehicle wheel bearing has an inner member that is configured to be fixed to the vehicle body-side member, and an outer member that is configured to be connected to the vehicle wheel and that rotates relative to the inner member.

6. The axle support structure according to claim 2, wherein the floating shaft has at least one of an elastic member for urging the first linking part toward the drive source output shaft, and an elastic member for urging the second linking part toward the vehicle wheel.

7. The axle support structure according to claim 2, wherein the vehicle body-side member is provided with a shaft support part that faces an external peripheral surface of the floating shaft with a predetermined gap therebetween in a radial direction, and that regulates whirling of the floating shaft.

8. The axle support structure according to claim 7, wherein the shaft support part is configured from an auxiliary bearing for rotatably supporting the floating shaft relative to the vehicle body-side member when the floating shaft comes in contact.

9. The axle support structure according to claim 7, wherein the floating shaft has a weakest part relative to a bending direction load of the floating shaft located between the shaft support part and the second linking part of the floating shaft.

10. The axle support structure according to claim 7, wherein the floating shaft has a partitioning wall extending in the radial direction from an intermediate part, and partitioning the floating shaft into an area where the first linking part is disposed and an area where the second linking part is disposed.

11. The axle support structure according to claim 1, wherein the second linking part has a larger diameter than a diameter of the first linking part.

12. The axle support structure according to claim 1, wherein the vehicle wheel bearing has an inner member that is configured to be fixed to the vehicle body-side member, and an outer member that is configured to be connected to the vehicle wheel and that rotates relative to the inner member.

13. The axle support structure according to claim 1, wherein the floating shaft has at least one of an elastic member for urging the first linking part toward the drive source output shaft, and an elastic member for urging the second linking part toward the vehicle wheel.

14. The axle support structure according to claim 1, wherein the vehicle body-side member is provided with a shaft support part that faces an external peripheral surface of the floating shaft with a predetermined gap therebetween in a radial direction, and that regulates whirling of the floating shaft.

15. The axle support structure according to claim 14, wherein the shaft support part is configured from an auxiliary bearing for rotatably supporting the floating shaft relative to the vehicle body-side member when the floating shaft comes in contact.

16. The axle support structure according to claim 15, wherein the auxiliary bearing is a metal bearing.

17. The axle support structure according to claim 14, wherein the floating shaft has a weakest part relative to a bending direction load of the floating shaft located between the shaft support part and the second linking part of the floating shaft.

18. The axle support structure according to claim 1, wherein the floating shaft has a partitioning wall extending in the radial direction from an intermediate part, and partitioning the floating shaft into an area where the first linking part is disposed and an area where the second linking part is disposed.

19. The axle support structure according to claim 1, wherein the floating shaft is disposed on an inner side of the vehicle wheel bearing.

20. The axle support structure according to claim 1, further comprising a case accommodating the speed reducer, the speed reducer including a sun gear configured to be disposed on a motor output shaft of the drive source, a ring gear fixed to the case, a plurality of pinion gears meshing with the sun gear and the ring gear, and a carrier that rotatably supports the pinion gears on the case.

* * * * *